US 12,541,707 B2

United States Patent
Li et al.

(10) Patent No.: US 12,541,707 B2
(45) Date of Patent: Feb. 3, 2026

(54) METHOD AND SYSTEM FOR DEVELOPING A MACHINE LEARNING MODEL

(71) Applicant: JPMorgan Chase Bank, N.A., New York, NY (US)

(72) Inventors: Minghua Li, West New York, NJ (US); Nicholas Romano, New York, NY (US); Yicheng Pu, Jersey City, NJ (US); Zaiying Huang, New Hyde Park, NY (US); Lei Carol Liang, Hamburg, NJ (US); Kanika Gandhi, Syosset, NY (US); Drew Afromsky, New York, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 1040 days.

(21) Appl. No.: 17/212,464

(22) Filed: Mar. 25, 2021

(65) Prior Publication Data

US 2021/0304073 A1   Sep. 30, 2021

Related U.S. Application Data

(60) Provisional application No. 63/000,266, filed on Mar. 26, 2020.

(51) Int. Cl.
*G06N 20/00* (2019.01)
*G06N 5/02* (2023.01)

(52) U.S. Cl.
CPC ............. *G06N 20/00* (2019.01); *G06N 5/027* (2013.01)

(58) Field of Classification Search
CPC ........ G06N 20/00; G06N 5/027; G06N 3/105; G06F 2119/20; G06T 7/0006; G06V 30/191
See application file for complete search history.

(56) References Cited

U.S. PATENT DOCUMENTS

| | | | |
|---|---|---|---|
| 7,617,504 B1 * | 11/2009 | Hill | G06F 9/548 709/213 |
| 11,030,526 B1 * | 6/2021 | Goodsitt | G06N 20/20 |
| 11,269,911 B1 * | 3/2022 | Jones | G06F 16/254 |
| 2009/0307162 A1 * | 12/2009 | Bui | G06N 5/022 706/54 |
| 2010/0162244 A1 * | 6/2010 | Tsai | G06F 9/505 718/100 |
| 2017/0185921 A1 * | 6/2017 | Zhang | G06N 20/00 |
| 2017/0372232 A1 * | 12/2017 | Maughan | G06F 3/0482 |

(Continued)

OTHER PUBLICATIONS

Hwang, Kyoung Soon "Autonomous Machine Learning Modeling Using a Task Ontology." 2018 Joint 10th International Conference on Soft Computing and Intelligent Systems (SCIS) and 19th International Symposium on Advanced Intelligent Systems (ISIS). IEEE, 2018. 244-248 (Year: 2018).*

*Primary Examiner* — James D. Rutten
(74) *Attorney, Agent, or Firm* — Greenblum & Bernstein, P.L.C.

(57) ABSTRACT

A framework for easy development of a machine learning solution is provided. The framework includes connecting data sources at all scale levels from a user; assessing data schema, data risk, and data quality status; performing scalable feature engineering and transformation; and automating machine learning model optimization. The framework also includes functionalities for generating production code and automatic model documentation.

20 Claims, 6 Drawing Sheets

(56) References Cited

U.S. PATENT DOCUMENTS

| | | | |
|---|---|---|---|
| 2018/0060744 A1* | 3/2018 | Achin | G06N 20/00 |
| 2019/0362222 A1* | 11/2019 | Chen | G06F 11/3476 |
| 2020/0081691 A1* | 3/2020 | Gupta | G06N 3/082 |
| 2020/0293933 A1* | 9/2020 | Ghosh | G06F 18/24147 |
| 2021/0117243 A1* | 4/2021 | Ghafourifar | G06F 9/5044 |
| 2021/0192397 A1* | 6/2021 | Rastogi | G06N 20/00 |

\* cited by examiner

METHOD AND SYSTEM FOR DEVELOPING A MACHINE LEARNING MODEL

CROSS-REFERENCE TO RELATED APPLICATIONS

This application claims the benefit of U.S. Provisional Patent Application Ser. No. 63/000,266, filed Mar. 26, 2020, which is hereby incorporated by reference in its entirety.

BACKGROUND

1. Field of the Disclosure

This technology generally relates to methods and systems for developing a machine learning model, and more particularly to methods and systems for developing a machine learning model based on user provided workflows in a modularized framework.

2. Background Information

Many business entities use decentralized model development frameworks to develop and implement machine learning models based on business requirements and workflows. Historically, using such decentralized development frameworks have resulted in varying degrees of success with respect to model development efficiency and the quality of the resulting models.

One drawback of using a conventional decentralized development framework is that in many instances, the decentralized development framework is fragmented into several manual processes. As a result, models require large investments of business resources to develop. In addition, fragmented manual development of models results in many different model implementation strategies for a business entity due to different developers utilizing many different development practices.

Therefore, there is a need for a centralized modularized framework with specialized modules utilizing model development best practices to automate and simplify the machine learning model development process.

SUMMARY

The present disclosure, through one or more of its various aspects, embodiments, and/or specific features or sub-components, provides, inter alia, various systems, servers, devices, methods, media, programs, and platforms for developing a machine learning model based on user provided workflows in a modularized framework.

According to an aspect of the present disclosure, a method for developing at least one model is provided. The method is implemented by at least one processor. The method includes receiving, from a user via a graphical user interface, at least one input that relates to a workflow, the workflow may include at least one from among a data engineering workflow and a feature development workflow; determining, via a data assembler, whether data included in the at least one input is in compliance with a predetermined data schema; generating, via a data explorer, at least one data diagnostic report that relates to an analysis of at least one characteristic for the at least one input; generating, via the data assembler, at least one modeling strategy that relates to a development of at least one feature for the at least one input; and generating, via the data assembler, the at least one model for the at least one input by using at least one design matrix that relates to at least one explanatory variable from the at least one modeling strategy.

In accordance with an exemplary embodiment, the method may further include automatically optimizing, via the data model optimizer, the at least one model by using multi-stage processor parallelization to determine at least one solution for the at least one model; and generating, via the data model optimizer, at least one final model based on the at least one solution.

In accordance with an exemplary embodiment, the optimizing may include using at least one global optimization routine, the at least one global optimization routine may include at least one from among a Bayesian optimization routine, a grid search optimization routine, a reinforcement learning optimization routine, a gradient descent optimization routine, a genetic algorithm optimization routine, a simulated annealing optimization routine, a covariance matrix adaptation evolution strategy (CMA-ES) optimization routine, and a Gaussian process optimization routine.

In accordance with an exemplary embodiment, the multi-stage processor parallelization may include separating the computation parallelization into multiple processing stages.

In accordance with an exemplary embodiment, the method may further include automatically generating, via a code repository manager, at least one final code that relates to a computer program code based on the at least one final model; automatically generating, via a documentation automation manager, at least one model review document that relates to model lifecycle traceability for the at least one final code; and automatically generating, via a model explainer, at least one explanation document, the explanation document may include behavior information and interaction information that corresponds to at least one from among an input process, an interim process, and an output process of the at least one final model.

In accordance with an exemplary embodiment, the at least one model review document may include at least one from among a data diagnostic information item, a feature engineering information item, a pre-modeling information item, a model optimization information item, a final model information item, and an implementation testing information item.

In accordance with an exemplary embodiment, the implementation testing information may include user acceptance testing information that relates to at least one from among an alpha test, a beta test, a contract acceptance test, a regulation acceptance test, an operational acceptance test, and a black box test.

In accordance with an exemplary embodiment, the method may further include determining a file size of the at least one input; and dynamically adjusting a processing paradigm based on the determined file size, the processing paradigm may relate to a number of processing component to allocate for the at least one input.

In accordance with an exemplary embodiment, the method may further include examining, via a model diagnostic tool, a feature distribution for each subset of data that is consumed by the at least one model; identifying, via the model diagnostic tool, at least one model instance that performs below a predetermined threshold based on a result of the examining, the at least one model instance may correspond to the at least one model; and displaying, via the graphical user interface, diagnostic information for the at least one model, the diagnostic information may include feature distribution information and model instance information that corresponds to the identified at least one model instance.

In accordance with an exemplary embodiment, the at least one model includes at least one from among a statistical model, a machine learning model, a mathematical model, a process model, and a data model.

According to an aspect of the present disclosure, a computing device configured to implement an execution of a method for developing at least one model is disclosed. The computing device comprising a processor; a memory; and a communication interface coupled to each of the processor and the memory, wherein the processor may be configured to receive, via a graphical user interface, at least one input that relates to a workflow from a user, the workflow may include at least one from among a data engineering workflow and a feature development workflow; determine, via a data assembler, whether data included in the at least one input is in compliance with a predetermined data schema; generate, via a data explorer, at least one data diagnostic report that relates to an analysis of at least one characteristic for the at least one input; generate, via the data assembler, at least one modeling strategy that relates to a development of at least one feature for the at least one input, and generate, via the data assembler, the at least one model for the at least one input by using at least one design matrix that relates to at least one explanatory variable from the at least one modeling strategy.

In accordance with an exemplary embodiment, the processor may be further configured to automatically optimize, via a data model optimizer, the at least one model by using multi-stage processor parallelization to determine at least one solution for the at least one model; and generate, via the data model optimizer, at least one final model based on the at least one solution.

In accordance with an exemplary embodiment, for the optimizing, the processor may be further configured to use at least one global optimization routine, the at least one global optimization routine including at least one from among a Bayesian optimization routine, a grid search optimization routine, a reinforcement learning optimization routine, a gradient descent optimization routine, a genetic algorithm optimization routine, a simulated annealing optimization routine, a covariance matrix adaptation evolution strategy (CMA-ES) optimization routine, and a Gaussian process optimization routine.

In accordance with an exemplary embodiment, for the multi-stage processor parallelization, the processor may be further configured to separate the computation parallelization into multiple processing stages.

In accordance with an exemplary embodiment, the processor may be further configured to automatically generate, via a code repository manager, at least one final code that relates to a computer program code based on the at least one final model; automatically generate, via a documentation automation manager, at least one model review document that relates to model lifecycle traceability for the at least one final code; and automatically generate, via a model explainer, at least one explanation document, the explanation document may include behavior information and interaction information that corresponds to at least one from among an input process, an interim process, and an output process of the at least one final model.

In accordance with an exemplary embodiment, the at least one model review document includes at least one from among a data diagnostic information item, a feature engineering information item, a pre-modeling information item, a model optimization information item, a final model information item, and an implementation testing information item.

In accordance with an exemplary embodiment, the implementation testing information item includes user acceptance testing information that relates to at least one from among an alpha test, a beta test, a contract acceptance test, a regulation acceptance test, an operational acceptance test, and a black box test.

In accordance with an exemplary embodiment, the processor may be further configured to determine a file size of the at least one input; and dynamically adjust a processing paradigm based on the determined file size, the processing paradigm may relate to a number of processing component to allocate for the at least one input.

In accordance with an exemplary embodiment, the processor may be further configured to examine, via a model diagnostic tool, a feature distribution for each subset of data that is consumed by the at least one model; identify, via the model diagnostic tool, at least one model instance that performs below a predetermined threshold based on a result of the examining, the at least one model instance may correspond to the at least one model; and display, via the graphical user interface, diagnostic information for the at least one model, the diagnostic information may include feature distribution information and model instance information that corresponds to the identified at least one model instance.

In accordance with an exemplary embodiment, the at least one model includes at least one from among a statistical model, a machine learning model, a mathematical model, a process model, and a data model.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
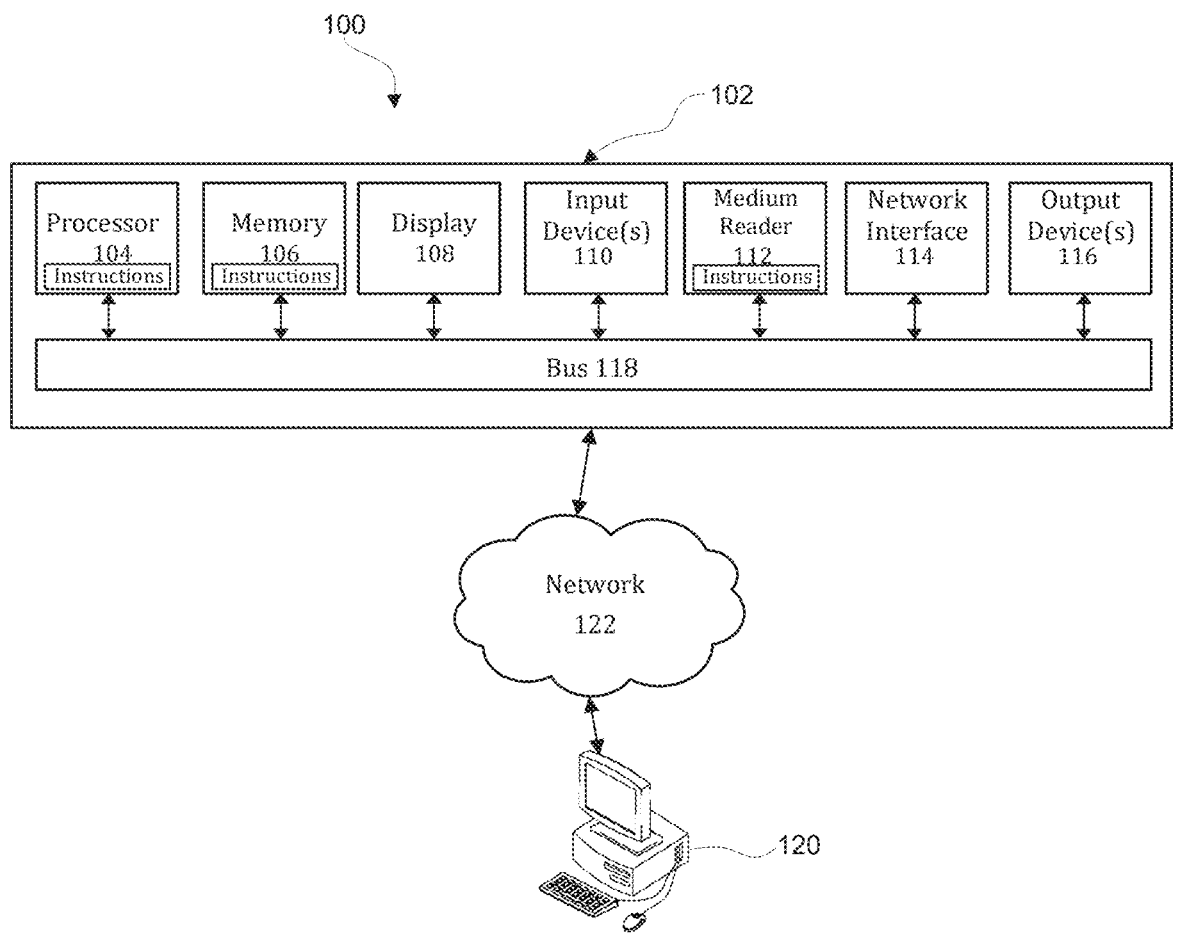
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks, cloud environment, or container systems. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), a tensor processing unit (TPU), or any combinations thereof. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g. software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment. Virtual computer system processing may include abstract machines that use device drivers targeting the abstract machine such as, for example, a virtual machine as well as operating system level virtualization such as, for example, container system processing.

As described herein, various embodiments provide optimized methods and systems for developing a machine learning model based on user provided workflows in a modularized framework.

Figure 2:
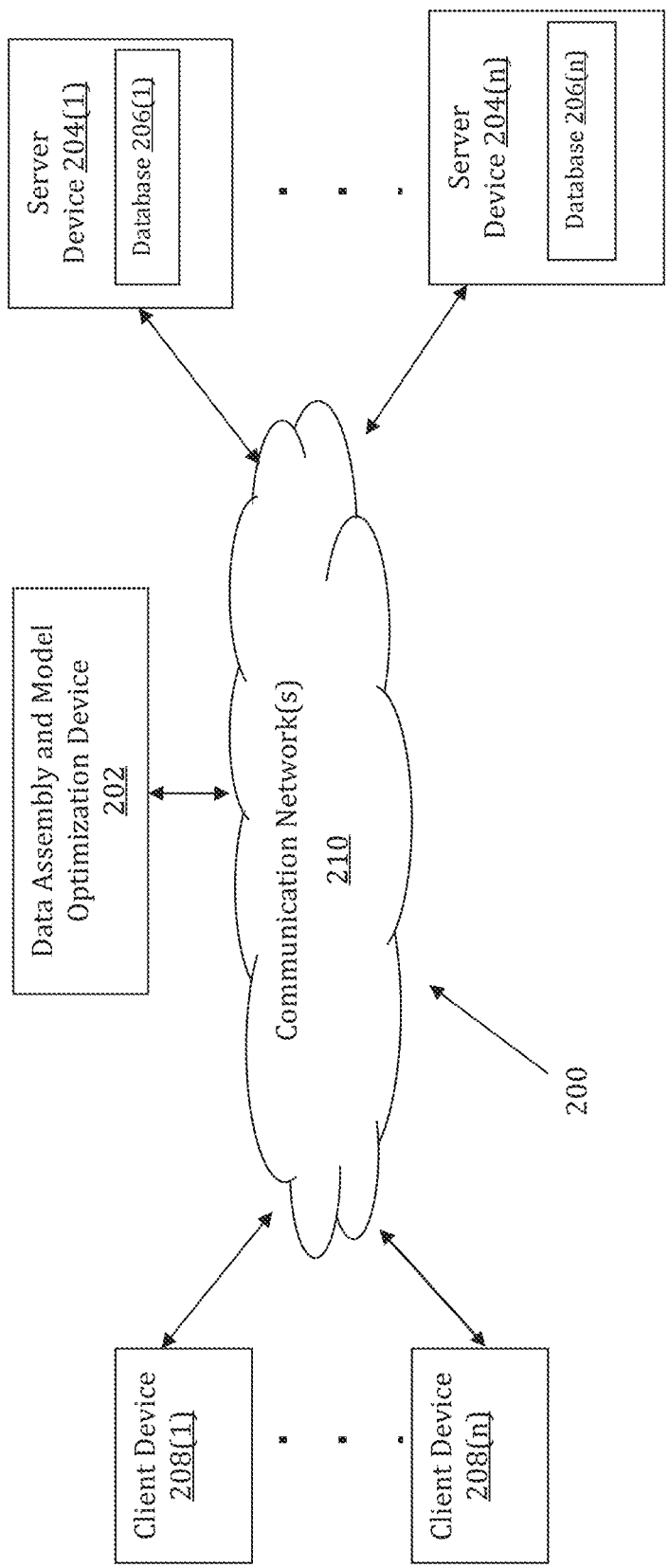
FIG. 2 illustrates an exemplary diagram of a network environment.

Referring to FIG. 2, a schematic of an exemplary network environment 200 for implementing a method for developing a machine learning model based on user provided workflows in a modularized framework is illustrated. In an exemplary embodiment, the method is executable on any networked computer platform, such as, for example, a personal computer (PC).

The method for developing a machine learning model based on user provided workflows in a modularized framework may be implemented by a Data Assembly and Model Optimization (DAMO) device 202. The DAMO device 202 may be the same or similar to the computer system 102 as described with respect to FIG. 1. The DAMO device 202 may store one or more applications that can include executable instructions that, when executed by the DAMO device 202, cause the DAMO device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s), container system(s), or virtual server(s) that may be managed in a cloud-based computing environment. Also, the application(s), and even the DAMO device 202 itself, may be located in virtual server(s) running in a cloud-based computing environment rather than being tied to one or more specific physical network computing devices. Also, the application(s) may be running in one or more virtual machines (VMs) executing on the DAMO device 202. Additionally, in one or more embodiments of this technology, virtual machine(s) running on the DAMO device 202 may be managed or supervised by a hypervisor.

In the network environment 200 of FIG. 2, the DAMO device 202 is coupled to a plurality of server devices 204(1)-204(n) that hosts a plurality of databases 206(1)-206(n), and also to a plurality of client devices 208(1)-208(n) via communication network(s) 210. A communication interface of the DAMO device 202, such as the network interface 114 of the computer system 102 of FIG. 1, operatively couples and communicates between the DAMO device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the DAMO device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and DAMO devices that efficiently implement a method for developing a machine learning model based on user provided workflows in a modularized framework.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The DAMO device 202 may be a standalone device or integrated with one or more other devices or apparatuses, such as one or more of the server devices 204(1)-204(n), for example. In one particular example, the DAMO device 202 may include or be hosted by one of the server devices 204(1)-204(n), and other arrangements are also possible. Moreover, one or more of the devices of the DAMO device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the DAMO device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store data that relates to model development lifecycle metadata as well as input data source and corresponding final code.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, container systems, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the DAMO device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the DAMO device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the DAMO device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the DAMO device 202, the server devices 204(1)-204(n), or the client devices 208(1)-208(n), for example, may be configured to operate as virtual instances on the same physical machine. In other words, one or more of the DAMO device 202, the server devices 204(1)-204(n), or the client devices 208(1)-208(n) may operate on the same physical device rather than as separate devices communicating through communication network(s) 210. Additionally, there may be more or fewer DAMO devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
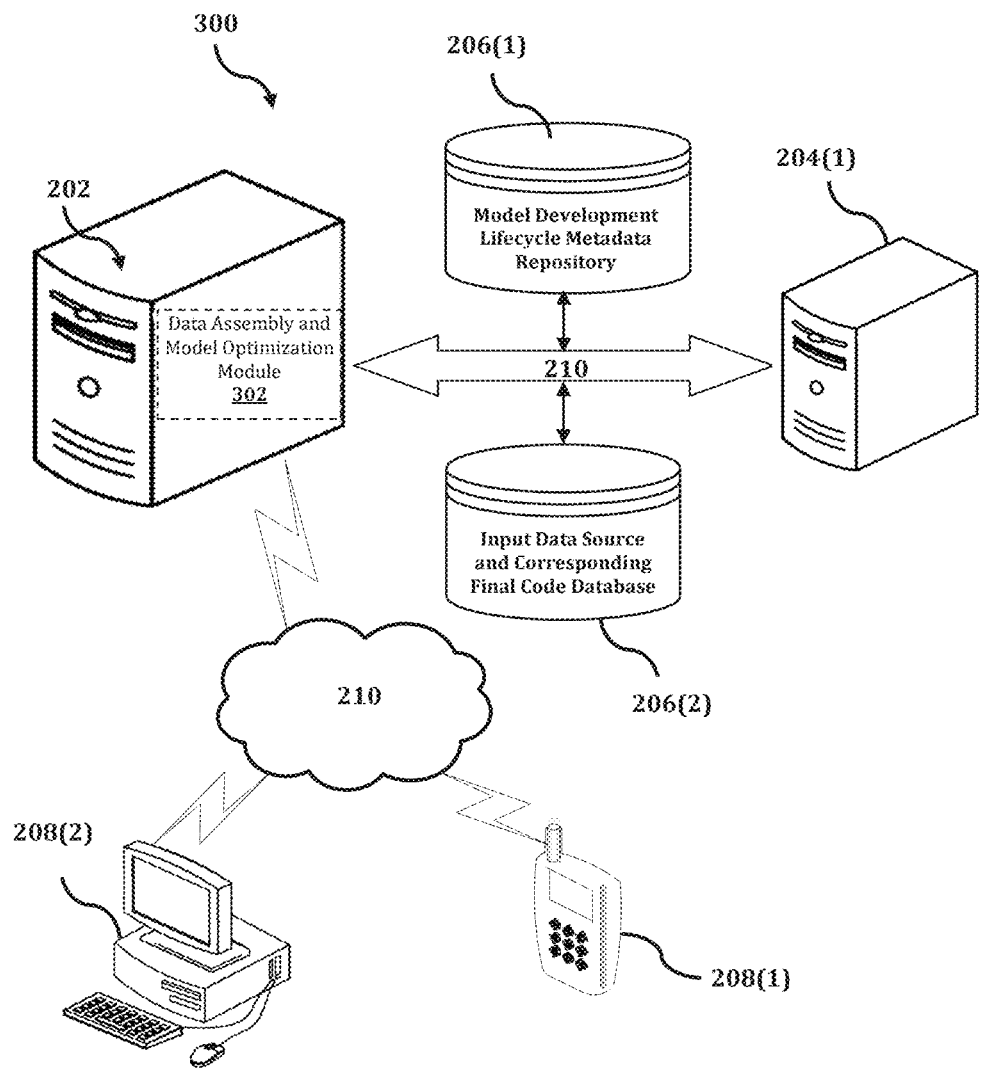
FIG. 3 shows an exemplary system for implementing a method for developing a machine learning model based on user provided workflows in a modularized framework.

The DAMO device 202 is described and shown in FIG. 3 as including a data assembly and model optimization module 302, although it may include other rules, policies, modules, databases, or applications, for example. As will be described below, the data assembly and model optimization module 302 is configured to implement a method for developing a machine learning model based on user provided workflows in a modularized framework.

An exemplary process 300 for implementing a mechanism for developing a machine learning model based on user provided workflows in a modularized framework by utilizing the network environment of FIG. 2 is shown as being executed in FIG. 3. Specifically, a first client device 208(1) and a second client device 208(2) are illustrated as being in communication with DAMO device 202. In this regard, the first client device 208(1) and the second client device 208(2) may be "clients" of the DAMO device 202 and are described herein as such. Nevertheless, it is to be known and understood that the first client device 208(1) and/or the second client device 208(2) need not necessarily be "clients" of the DAMO device 202, or any entity described in association therewith herein. Any additional or alternative relationship may exist between either or both of the first client device 208(1) and the second client device 208(2) and the DAMO device 202, or no relationship may exist.

Further, DAMO device 202 is illustrated as being able to access a model development lifecycle metadata repository 206(1) and an input data source and corresponding final code database 206(2). The data assembly and model optimization module 302 may be configured to access these databases for implementing a method for developing a machine learning model based on user provided workflows in a modularized framework.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the DAMO device 202 via broadband or cellular communication. Of course, these embodiments are merely exemplary and are not limiting or exhaustive.

Upon being started, the data assembly and model optimization module 302 executes a process for developing a machine learning model based on user provided workflows in a modularized framework. An exemplary process for developing a machine learning model based on user provided workflows in a modularized framework is generally indicated at flowchart 400A in FIG. 4A and flowchart 400B in FIG. 4B.

Figure 4A:
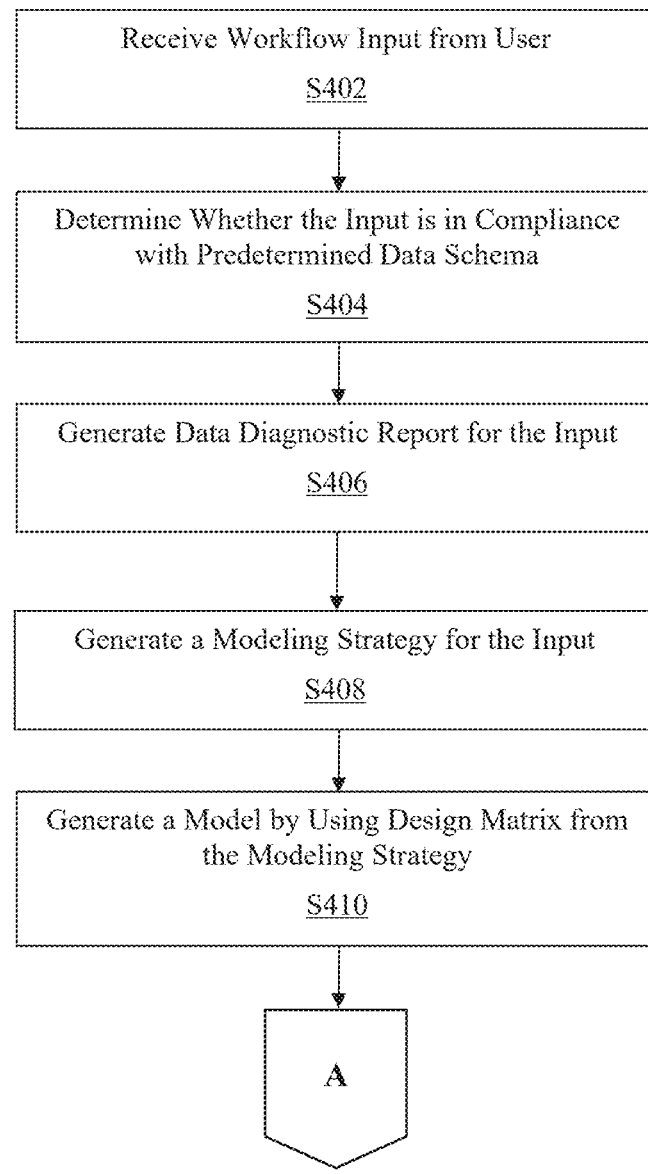
FIG. 4A is a flowchart of an exemplary process for implementing a method for developing a machine learning model based on user provided workflows in a modularized framework.

In the process 400A of FIG. 4A, at step S402, an input relating to at least one workflow may be received from a user via a graphical user interface. The workflow may include a sequence of tasks that processes a set of data such as, for example, a data engineering workflow and a feature development workflow. In an exemplary embodiment, the graphical user interface may include a user interface that allows the user to interact with electronic devices through graphical icons and audio indicators such as, for example, a primary notation. The graphical user interface may include a progress indicator and a computation monitor enabling easy process tracking and prioritizing by the user. The graphical user interface may also include a resource monitor to monitor resource utilization and a resource manager. A person of ordinary skill in the art would appreciate that the graphical user interface may operate on a computing device and the graphical user interface may receive inputs from the user via an external component attached to a computing device such as, for example, a keyboard and a computer mouse as well as from a component integrated into the computing device such as, for example, a touch screen.

In another exemplary embodiment, the input may include the data engineering workflow and the feature development workflow, as well as any combinations thereof, in different file formats such as, for example, a python file format. A workflow may include an orchestrated and repeatable pattern of activity, enabled by the systematic organization of resources into procedures that provide services and process information. In another exemplary embodiment, the data engineering workflow may include data processing tasks focusing on finding practical answers to questions via data analysis such as, for example, determining whether a certain user may be interested in a financial product based on the user's characteristics. In another exemplary embodiment, the feature development workflow may include an iterative and incremental software development process such as, for example, the development of a mobile banking application based on a predeveloped platform.

In another exemplary embodiment, the input may include workflows of varying file sizes. The graphical user interface may be simplified to automatically adjust constraints based on input file sizes without user intervention. In another exemplary embodiment, a processing paradigm may automatically be adjusted based on input file size such as, for example, utilizing a single processing core for small file sizes and utilizing multiple processing cores/graphics processing units (GPUs), as well as cluster processing, for simultaneous processing of large file sizes.

At step S404, whether data included in the input is in compliance with a predetermined data schema may be determined via a data assembler. In an exemplary embodiment, data compliance may include data compliance testing of the input based on predetermined guidelines such as, for example, a business guideline and a regulatory guideline. The business guideline may include predetermined rules for the use of a business entity's data such as, for example, a data schema representing a plan, in the form of a model, for utilizing private user data. The regulatory guideline may include predetermined rules imposed on a business entity such as, for example, a government entity requiring financial institutions to report suspicious user account activities.

In another exemplary embodiment, the data assembler may include a separate module as well as an integrated component of a computing system. The data assembler may operate based on a set of rules such as, for example, a chain-style syntax that defines the combination of symbols and structures of a computing language. In another exemplary embodiment, the chain-style syntax may include the arranging of all data operations performed in the data assembler as a modular component configuration such as, for example, in a chain where the previous operation's output automatically becomes the input for the next operation. In another exemplary embodiment, the chain-style syntax may enable asynchronous operations enabling the user to start multiple data operations without waiting sequentially for each module to finish processing.

In another exemplary embodiment, the data assembler may include a unified operation interface for inputs of various data scales relating to file sizes. The unified operation interface of the data assembler may enable a user to provide data of vastly different sizes as inputs. In another exemplary embodiment, the data assembler may provide features to flexibly access various data sources with various data scales. In another exemplary embodiment, the unified operation interface may automatically adjust processing parameters based on the user input enabling the user to provide data of vastly different sizes without complexities associated with manually configuring different tools for different data sizes. In another exemplary embodiment, the data assembler may provide a rich set of features for data merging and transformation with automatic scaling based on data size.

In another exemplary embodiment, the data assembler may include an automated component for packaging production code such as, for example, an automated code packaging module. The automated code packaging module of the data assembler may automatically package data operation code within the assembler into code ready to execute in a production environment. In another exemplary embodiment, the code ready to execute in a production environment may follow predetermined production ready criteria for implementing computer codes. In another exemplary embodiment, the automated code packaging model may generate reports such as, for example, a run-time efficiency report that estimates and anticipates the increase in runtime of an algorithm based on an increase in input size.

In another exemplary embodiment, the data assembler may include a tracking component for historical logging of data operations. The data operation history tracking component of the data assembler may automatically keep a sequential mapping of all operations involved in a resulting processed dataset enabling a user to easily debug previous data operations and reproduce results from previous data operations. In another exemplary embodiment, the data assembler may provide automatic history logging functionalities, which tracks every method utilized to generate a final dataset such as, for example, the design matrix as well as to generate production code.

In another exemplary embodiment, the data assembler may include a features catalog enabling automatic schema tracking and validation of data operations. The features catalog may include metadata providing information for features developed and implemented by the data assembler. As will be appreciated by a person of ordinary skill in the art, the metadata may include descriptive metadata providing for information about a resource to identify the resource, structural metadata providing for information about containers of data and how compound objects are put together, administrative metadata providing for information about resource types and data permissions, reference metadata providing for information about the contents and quality of statistical data, and statistical metadata providing for information about the processes that collect, analyze, and produce statistical data. In another exemplary embodiment, the data assembler may provide features to allow easy information access to a table schema, a risk information, a compliance information, and a data quality summary such as, for example, row counts, column counts, maximum values, and minimum values.

At step S406, a data diagnostic report relating to an analysis of a characteristic may be generated via a data explorer for the input. In an exemplary embodiment, the data explorer may include a data explorer module operable to perform exploratory data analysis on assembled data. The exploratory data analysis may include analyzing data sets to summarize the dataset's main characteristics. In another exemplary embodiment, exploratory data analysis may include initial investigations on the assembled data to discover patterns, to spot anomalies, and to test hypotheses. The data diagnostic report may include at least one from among a text document containing statistical data, a graphical representation of statistical data, an interactive user interface, and a programming code for the implementation of statistical data.

At step S408, a modeling strategy relating to a development of a feature may be generated via the data assembler for the input. In an exemplary embodiment, feature engineering may include the process of using domain knowledge to extract features from raw data via data mining techniques. The feature may include an individual measurable property or characteristic of a phenomenon being observed in machine learning and pattern recognition. In another exemplary embodiment, the modeling strategy may incorporate predetermined procedures that are accepted or prescribed as being correct or most effective such as, for example, best practices for modeling data.

In another exemplary embodiment, machine learning and pattern recognition may include supervised learning algorithms such as, for example, regression analysis, decision tree analysis, random forest analysis, k-nearest neighbors analysis, logistic regression analysis, etc. In another exemplary embodiment, machine learning analytical techniques may include unsupervised learning algorithms such as, for example, Apriori analysis, K-means clustering analysis, etc. In another exemplary embodiment, machine learning analytical techniques may include reinforcement learning algorithms such as, for example, Markov Decision Process, etc.

At step S410, a model for the input may be generated via the data assembler by using a design matrix relating to an explanatory variable from the modeling strategy. The design matrix may include at least one from among a model matrix and a regressor matrix. In an exemplary embodiment, the design matrix may include a collection of feature vectors for different data points. The data points may represent scalar responses such as, for example, dependent variables as well as explanatory variables such as, for example, independent variables. In another exemplary embodiment, the design matrix may include the basic data object upon which machine learning algorithms operate. As will be appreciated by a person of ordinary skill in the art, the feature vector may include a vector containing all of the feature values for a given data point. Likewise, the feature may include an individual measurable property and a characteristic of a phenomenon observed in machine learning and pattern recognition analysis.

In another exemplary embodiment, the model may be based on a machine learning algorithm. The machine learning algorithm may include at least one from among a process and a set of rules to be followed by a computer in calculations and other problem-solving operations such as, for example, a linear regression algorithm, a logistic regression algorithm, a decision tree algorithm, or a Naive Bayes algorithm.

In another exemplary embodiment, the model may include a mathematical representation of a real-world process such as, for example, a machine learning model, a statistical model, a mathematical model, a process model, and a data model. In another exemplary embodiment, the model may include training models such as, for example, a machine learning model which is generated to be further trained on additional data. Once the training model has been sufficiently trained, the training model may be deployed onto various connected systems to be utilized. In another exemplary embodiment, the training model may be sufficiently trained when model assessment methods such as, for example, a holdout method, a K-fold-cross-validation method, and a bootstrap method determine that the training model's least squares error rate, true positive rate, true negative rate, false positive rate, and false negative rates are within predetermined ranges. In another exemplary embodiment, the training model may be operable, i.e., actively utilized by an organization, while continuing to be trained using new data. In another exemplary embodiment, the models may be generated using at least one from among an artificial neural network technique, a decision tree technique, a support vector machines technique, a Bayesian network technique, and a genetic algorithms technique.

Figure 4B:
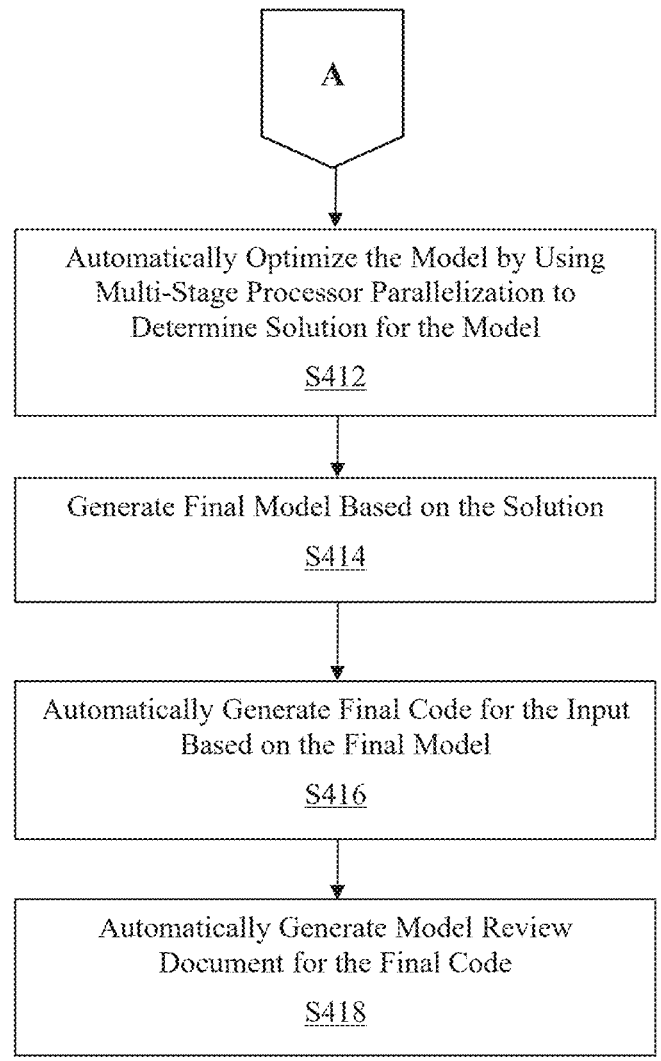
FIG. 4B is a flowchart of an exemplary process for implementing a method for developing a machine learning model based on user provided workflows in a modularized framework.

Then, in the process 400B of FIG. 4B at step S412, the model may be automatically optimized via the data model optimizer by using multi-stage processor parallelization to determine a solution for the model. In an exemplary embodiment, the data model optimizer may optimize the model by defining loss functions and attempting to minimize the loss functions by applying optimizing algorithms such as, for example, a stochastic gradient descent algorithm, an Adam algorithm, and an AdaGrad optimization algorithm to the model. In another exemplary embodiment, the solution, as it applies to machine learning, may include an iterative pattern determined based on a given input. The solution may incorporate optimization algorithms to minimize loss functions. In another exemplary embodiment, the data model optimizer may utilize multi-stage processor parallelization to separate the optimization computation into multiple stages enabling separate instances of the optimization process to occur at the same time.

In another exemplary embodiment, the data model optimizer may utilize a global optimization routine to optimize the model. The global optimization routine may include optimization routines such as, for example, a Bayesian optimization routine, a grid search optimization routine, a reinforcement learning optimization routine, a gradient descent optimization routine, a genetic algorithm optimization routine, a simulated annealing optimization routine, a covariance matrix adaptation evolution strategy (CMA-ES) optimization routine, and a Gaussian process optimization routine. In another exemplary embodiment, the data model optimizer may provide various optimization algorithms such as, for example, a genetic optimization algorithm, a simulate annealing algorithm, a Bayesian optimization algorithms, and a multi-arm bandit algorithm to automate the optimization process of machine learning solution fine-tuning. The optimization process may be parallelized across various central processing units, graphical processing units, and Hadoop clusters based on the operational environment of the user.

In another exemplary embodiment, the data model optimizer may utilize any machine learning technique to optimize the model. The machine learning techniques may be used to generate an optimization model and trained using development lifecycle data to further optimize developed models.

In another exemplary embodiment, the data model optimizer may calculate and execute processes simultaneously in a computational schema such as, for example a computational parallelization schema to separate a process into multiple stages to allow for multiple simultaneous calculations. The computational parallelization schema may include software and hardware components, which divide large computations into smaller computational fragments for simultaneous execution. In another exemplary embodiment, the computational parallelization schema may be operable on a single processor as well as multiple processors connected via a network interface.

In another exemplary embodiment, the data model optimizer may enable the handling of a search space with both continuous parameter dimensions as well as discrete parameter dimensions. The data model optimizer may adapt a special search algorithm to better navigate the search space and to improve performance. In another exemplary embodiment, the continuous parameter dimension may include a numeric parameter that may hold any value in a specified interval. The discrete parameter dimension may include a numeric parameter that, for any value in a range of values that the parameter is permitted to hold, includes a positive minimum distance to the nearest other permissible value. In another exemplary embodiment, the search space may include a set of all possible points of an optimization problem that satisfy the problem's constraints such as, for example, an inequality constraint, an equality constraint, and an integer constraint.

In another exemplary embodiment, the data model optimizer may utilize a quality control result from a machine learning explain-ability score and customized business objectives as optimization criteria to improve optimization performance. The machine learning explain-ability score may include an automatic scoring and a manual scoring of the resulting solution of machine learning analysis. The score may include a representation of understandability of the resulting solution for a human operator. In another exemplary embodiment, the score may include a textual representation as well as a graphical representation of the understandability.

In another exemplary embodiment, the data model optimizer may automatically utilize error density analysis to re-optimize the feature selection choices and the engineering operation choices to improve model performance. The error density analysis may include an analysis of the type of errors and the quantity of errors that may be present in a solution to a corresponding model. In another exemplary embodiment, the error density analysis may include a closed loop error analysis technique that may be integrated into the data model optimizer.

In another exemplary embodiment, the data model optimizer may incorporate an automated process such as, for example, a handshake process to communicate between various connected modules via the exchange of information that establishes predetermined standards for the communicating modules prior to actual communication. The handshake process may enable global optimization on the modeling component and the data engineering component through predetermined, agreed upon standards.

At step S414, a final model may be generated via the data model optimizer based on the solution. The final model may include models determined to be within an acceptable predetermined level of the established loss functions. In an exemplary embodiment, the final model may include the most optimized model such as, for example, the model with the highest efficiency based on calculated loss functions. The final model may include a combination of several different models based on predetermined characteristics.

At step S416, a final code relating to a computer program code may be automatically generated via a code repository manager based on the at least one final model. In an exemplary embodiment, the final code may include a production ready computer program code automatically generated to implement the final model. As will be appreciated by a person of ordinary skill in the art, the computer program code may include a set of instructions to be executed by a computer and may be written in a variety of computing languages such as, for example, a python computing language and a java computing language. In another exemplary embodiment, the data model optimizer may provide a quick process to package the final model together with all processed data from the data assembler into a deployable code script. The automatically generated final code script may be required to meet predetermined percentages such as, for example, 80% to 90% of the implementation requirement of the internal system.

In another exemplary embodiment, the code repository manager may include an automated tool for generating source codes based on an input. The code repository manager may include a file archive of framework source codes upon which the final code may be built. The final code may include production ready code for implementation. The archived framework source codes may be preselected based on business guidelines as well as agreed upon industry standards.

At step S418, a model review document relating to model lifecycle traceability may be automatically generated via a documentation automation manager for the final code. The model review document may be automatically generated by the document automation manager and may include data relating to the development lifecycle of the final code. The document automation manager may include a document assembly module for the automatic creation of electronic documents.

In an exemplary embodiment, the document automation manager may automate all conditional text and variable text relating to the model lifecycle traceability for the final code. The model lifecycle traceability of the final code may include requirements traceability relating to the degree to which a relationship can be established between two or more products of the development process, the identification and documentation of derivation paths, theoretical derivation paths, and allocation paths of work products in the work product hierarchy, the degree to which each element in a software development product establishes its reason for existing, and the discernible association among two or more logical entities such as, for example, a requirement, a system element, a verification, and a task. In another exemplary embodiment, the document automation manager may utilize data sources from the data assembler's meta data tracking mechanism and quality control functionalities as well as the data model optimizer's optimization history logs to generate model review documentations relating to a full model development lifecycle.

In an exemplary embodiment, the model review document may include at least one from among a data diagnostic information item, a feature engineering information item, a pre-modeling information item, a model optimization information item, a final model information item, and an implementation testing information item. The implementation testing information may include user acceptance testing information relating to at least one from among an alpha test, a beta test, a contract acceptance test, a regulation acceptance test, an operational acceptance test, and a black box test.

Figure 5:
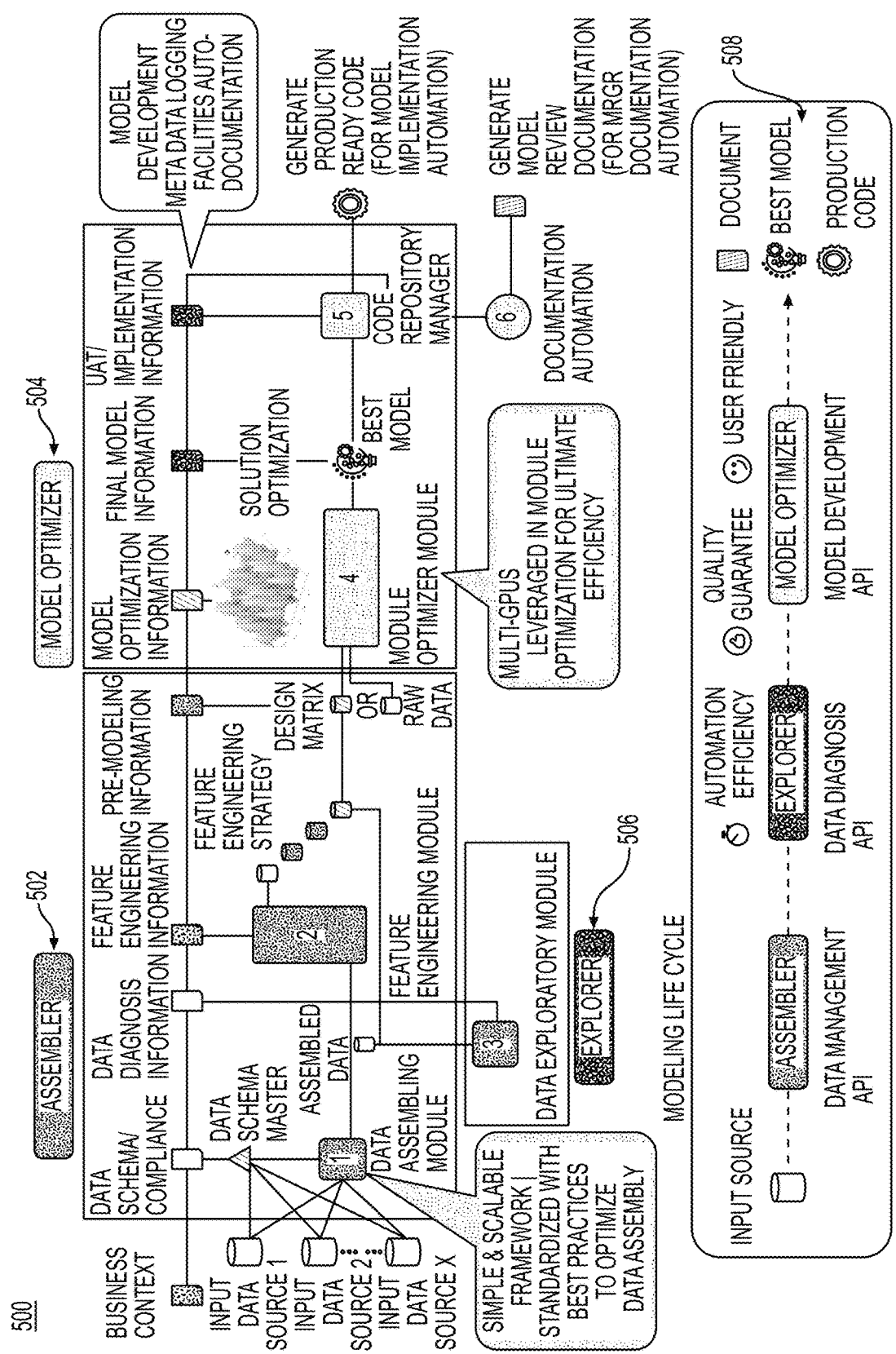
FIG. 5 is a flow diagram that illustrates an exemplary process for implementing a method for developing a machine learning model based on user provided workflows in a modularized framework.

FIG. 5 is a flow diagram 500 that illustrates an exemplary process for implementing a method for developing a machine learning model based on user provided workflows in a modularized framework. The flow diagram 500 illustrates a data assembler 502 connected to a data explorer 506 and a data model optimizer 504.

An exemplary development process begins with data assembler 502. Input data source 1 through input data source X may be received by a data assembling module of data assembler 502. The data assembling module may provide a simple and scalable framework for the processing of workflow inputs. The data assembling module may also provide a standardized framework based on predetermined best practices relating to optimizing data assembly. The data assembling module may utilize a data schema master to verify the input data against predetermined data schemas to ensure compliance. The data schema and compliance requirements may be based on a predetermined business context from an entity.

After assembling data based on the input data sources, the data assembling module may output the assembled data to a data exploratory module of data explorer 506. The data exploratory module examines the characteristics of the assembled data and generates data diagnostic information. The data diagnostic information may include metadata corresponding to the assembled data. The assembling module may also output the assembled data to a feature engineering module of data assembler 502. The feature engineering module further processes the assembled data to generate feature engineering information.

Data assembler 502 may then generate a modeling strategy such as, for example, a feature engineering strategy based on the processed information from the feature engineering module of data assembler 502 and the data exploratory module of data explorer 506. Using the feature engineering strategy, data assembler 502 may generate a design matrix for the creation of a model. The design matrix may also include pre-modeling information corresponding to the design matrix. In another exemplary embodiment, data assembler 502 may not process the input data sources and simply output the raw data directly to the next component.

Data model optimizer 504 may then process the design matrix generated by data assembler 502, as well as any raw input data, by using the model optimizer module. The model optimizer module applies optimization functions previously described in the present application to optimize model solutions for the input source. The model optimizer module may utilize multiple graphics processing units (GPUs), multiple processing cores, and multiple processing computing clusters to efficiently optimize the generated models. The model optimizer module may also generate model optimization information relating to the optimization process for a corresponding model and solution.

Data model optimizer 504 may determine a best model based on results from the model optimizer module. Information relating to the determination process may be documented in a generated final model information metadata for the corresponding best model. The best model may then be received as input by a code repository manager. The code repository manager generates production ready codes to enable automated model implementation. In generating the production ready codes, the code repository manager may also utilize user acceptance testing (UAT) information as well as predetermined implementation information. In an exemplary embodiment, the code repository manager may receive the code from the assembler and package the code for automated model implementation.

Data model optimizer 504 may also incorporate a documentation automation module to combine the metadata corresponding to the generated production ready code and to generate model review documentation. The model development metadata logged during the development process may include a history of the development lifecycle for the generated production ready code and may enable automatic documentation. The logged metadata may also include data schema and compliance information, data diagnostic information, feature engineering information, pre-modeling information, model optimization information, final model information, and UAT/implementation information. In an exemplary embodiment, automated documentation may be a component separate from the optimizer.

The flow diagram 500 also includes a modeling lifecycle 508 illustrating an exemplary development process beginning with an input source processed in a data assembler by a data management application programing interface (API). The processed input source may then be analyzed in a data explorer by a data diagnostic API. Finally, the processed and analyzed input source may then be optimized in a data model optimizer by a model development API. The model development API may output for the user a best model relating to an optimized input source, a production code relating to computer programing code for the implementation of the best model, and a document relating to a development lifecycle, which includes a history of the development of the best model beginning from the input source to the final production code.

In another exemplary embodiment, the modularized framework may include an explanation component such as, for example, an explainer component that may be used to explain inputs, interims, and outputs of a machine learning model to further offer insights into a design of the model and a model solution. The explainer component may enable an explainable machine learning feature that offers insight into behaviors and interactions of at least one from among a model input, model data, a model parameter, a model hyperparameter, and a model output.

In another exemplary embodiment, the modularized framework may include a diagnostic tool such as, for example, a diagnoser tool for model debugging and for performance diagnostic. The diagnose tool may detect poor model performance instances by investigating the feature distribution difference between better performing subsets of data and worse performing subsets of data. In another exemplary embodiment, the diagnoser tool may display prediction accuracies for each of the subsets of data for several candidate models. A justification for advanced model treatment such as, for example, a model ensembling treatment may be provided when several candidate models have different prediction accuracies for each of the subsets of data.

In another exemplary embodiment, the modularized framework may include a search component such as, for example, a neural architecture search component. The neural architecture search component may correspond to an optimization methodology for discovering an optimal model architecture design for a neural network model. In another exemplary embodiment, optimization algorithms for the neural architecture search component may include any machine learning algorithm consistent with disclosures in the present application such as, for example, a reinforcement learning (RL) algorithm and a gradient-descent algorithm. The optimization algorithms may also include proprietary optimization routines such as, for example, a search strategy for discovering optimal elements of a search space.

In another exemplary embodiment, the modularized framework may include a selection component such as, for example, a feature selection component. The feature selection component may correspond to an optimization methodology for intelligently discovering features from input and/or source data that provides optimal predictive performance. The optimization methodology may include a selection algorithm that receives an input such as, for example, a data set, a specified constraint such as a monotonic data constraint and/or a feature interaction constraint that the selection algorithm utilizes to inform an output, as well as a specified rule. The selection algorithm may then use the input to transform the data set into different representations.

Accordingly, with this technology, an optimized process for developing a machine learning model based on user provided workflows in a modularized framework is provided.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for developing at least one model, the method being implemented by at least one processor, the method comprising:
    receiving, by the at least one processor via a graphical user interface, at least one input that relates to workflow that includes at least one from among a data engineering workflow and a feature development workflow,
        wherein the data engineering workflow includes a data processing task that identifies an answer to at least one question based on a corresponding user characteristic; and
        wherein the feature development workflow includes an iterative software development process that outputs an application based on a predeveloped platform;
    determining, by the at least one processor via a data assembler, whether data included in the at least one input is in compliance with a predetermined data schema;
    generating, by the at least one processor via a data explorer, at least one data diagnostic report that relates to an analysis of at least one characteristic for the at least one input;
    generating, by the at least one processor via the data assembler, at least one modeling strategy that relates to a development of at least one feature for the at least one input;
    generating, by the at least one processor via the data assembler, the at least one model for the at least one input by using at least one design matrix which comprises a sequential mapping of operations involved in producing a processed dataset and by using multi-stage processor parallelization to determine at least one solution for optimizing the at least one model,
        wherein the multi-stage processor parallelization includes separating computation parallelization into multiple processing stages, and
        wherein the at least one design matrix relates to at least one explanatory variable from the at least one modeling strategy;
    determining, by the at least one processor, a file size of the workflow;
    dynamically adjusting, by the at least one processor, a processing paradigm based on the file size,
        wherein the processing paradigm relates to a quantity of processing components that are allocated to the workflow,
        wherein each of the at least one design matrix includes a collection of at least one feature vector for a plurality of data points, and
    wherein each of the plurality of data points correspond to at least one scalar response;
    operating the data assembler based on a chain-style syntax that includes arranging operations of the data assembler in a chain; and
    utilizing, as input to a subsequent operation of the data assembler, output from a current operation of the data assembler.

2. The method of claim 1, further comprising:
    automatically optimizing, by the at least one processor via a data model optimizer, the at least one model by generating at least one final model based on the at least one solution.

3. The method of claim 2, wherein the optimizing includes using at least one global optimization routine, the at least one global optimization routine including at least one from among a Bayesian optimization routine, a grid search optimization routine, a reinforcement learning optimization routine, a gradient descent optimization routine, a genetic algorithm optimization routine, a simulated annealing optimization routine, a covariance matrix adaptation evolution strategy (CMA-ES) optimization routine, and a Gaussian process optimization routine.

4. The method of claim 2, further comprising:

automatically generating, by the at least one processor via a code repository manager, at least one final code that relates to a computer program code based on the at least one final model;

automatically generating, by the at least one processor via a documentation automation manager, at least one model review document that relates to model lifecycle traceability for the at least one final code; and automatically generating, by the at least one processor via a model explainer, at least one explanation document, the explanation document including behavior information and interaction information that corresponds to at least one from among an input process, an interim process, and an output process of the at least one final model.

5. The method of claim 4, wherein the at least one model review document includes at least one from among a data diagnostic information item, a feature engineering information item, a pre-modeling information item, a model optimization information item, a final model information item, and an implementation testing information item.

6. The method of claim 5, wherein the implementation testing information item includes user acceptance testing information that relates to at least one from among an alpha test, a beta test, a contract acceptance test, a regulation acceptance test, an operational acceptance test, and a black box test.

7. The method of claim 1, further comprising:

examining, by the at least one processor via a model diagnostic tool, a feature distribution for each subset of data that is consumed by the at least one model;

identifying, by the at least one processor via the model diagnostic tool, at least one model instance that performs below a predetermined threshold based on a result of the examining, the at least one model instance corresponding to the at least one model; and displaying, by the at least one processor via the graphical user interface, diagnostic information for the at least one model, the diagnostic information including feature distribution information and model instance information that corresponds to the identified at least one model instance.

8. The method of claim 1, wherein the at least one model includes at least one from among a statistical model, a machine learning model, a mathematical model, a process model, and a data model.

9. The method of claim 1, further comprising:

utilizing the chain-style syntax to perform operations asynchronously, wherein the dynamically adjusting comprises dynamically adjusting without user intervention and from a first processing paradigm to a second processing paradigm, and wherein at least one from among the first processing paradigm and the second processing paradigm utilizes at least a single processing core.

10. The method of claim 1, further comprising:

utilizing a features catalog to automate schema tracking and validate data operations that include the operations involved in producing the processed dataset.

11. A computing device configured to implement an execution of a method for developing at least one model, the computing device comprising:

a processor;

a memory; and a communication interface coupled to each of the processor and the memory, wherein the processor is configured to:

receive, via a graphical user interface, at least one input that relates to workflow that includes at least one from among a data engineering workflow and a feature development workflow, wherein the data engineering workflow includes a data processing task that identifies an answer to at least one question based on a corresponding user characteristic; and wherein the feature development workflow includes an iterative software development process that outputs an application based on a predeveloped platform;

determine, via a data assembler, whether data included in the at least one input is in compliance with a predetermined data schema;

generate, via a data explorer, at least one data diagnostic report that relates to an analysis of at least one characteristic for the at least one input;

generate, via the data assembler, at least one modeling strategy that relates to a development of at least one feature for the at least one input;

generate, via the data assembler, the at least one model for the at least one input by using at least one design matrix which comprises a sequential mapping of operations involved in producing a processed dataset and by using multi-stage processor parallelization to determine at least one solution for optimizing the at least one model, wherein the multi-stage processor parallelization includes separating computation parallelization into multiple processing stages, and wherein the at least one design matrix relates to at least one explanatory variable from the at least one modeling strategy;

determining, by the at least one processor, a file size of the workflow;

dynamically adjusting, by the at least one processor, a processing paradigm based on the file size, wherein the processing paradigm relates to a quantity of processing components that are allocated to the workflow, wherein each of the at least one design matrix includes a collection of at least one feature vector for a plurality of data points, and wherein each of the plurality of data points correspond to at least one scalar response;

operating the data assembler based on a chain-style syntax that includes arranging operations of the data assembler in a chain; and utilizing, as input to a subsequent operation of the data assembler, output from a current operation of the data assembler.

12. The computing device of claim 11, wherein the processor is further configured to:

automatically optimize, via a data model optimizer, the at least one model by generating at least one final model based on the at least one solution automatically optimizing, by the at least one processor via a data model optimizer, the at least one model by generating at least one final model based on the at least one solution.

13. The computing device of claim 12, wherein, for the optimizing, the processor is further configured to use at least one global optimization routine, the at least one global optimization routine including at least one from among a Bayesian optimization routine, a grid search optimization routine, a reinforcement learning optimization routine, a gradient descent optimization routine, a genetic algorithm optimization routine, a simulated annealing optimization routine, a covariance matrix adaptation evolution strategy (CMA-ES) optimization routine, and a Gaussian process optimization routine.

14. The computing device of claim 12, wherein the processor is further configured to:
   automatically generate, via a code repository manager, at least one final code that relates to a computer program code based on the at least one final model;
   automatically generate, via a documentation automation manager, at least one model review document that relates to model lifecycle traceability for the at least one final code; and
   automatically generate, via a model explainer, at least one explanation document, the explanation document including behavior information and interaction information that corresponds to at least one from among an input process, an interim process, and an output process of the at least one final model.

15. The computing device of claim 14, wherein the at least one model review document includes at least one from among a data diagnostic information item, a feature engineering information item, a pre-modeling information item, a model optimization information item, a final model information item, and an implementation testing information item.

16. The computing device of claim 15, wherein the implementation testing information item includes user acceptance testing information that relates to at least one from among an alpha test, a beta test, a contract acceptance test, a regulation acceptance test, an operational acceptance test, and a black box test.

17. The computing device of claim 11, wherein the processor is further configured to:
   examine, via a model diagnostic tool, a feature distribution for each subset of data that is consumed by the at least one model;
   identify, via the model diagnostic tool, at least one model instance that performs below a predetermined threshold based on a result of the examining, the at least one model instance corresponding to the at least one model; and
   display, via the graphical user interface, diagnostic information for the at least one model, the diagnostic information including feature distribution information and model instance information that corresponds to the identified at least one model instance.

18. The computing device of claim 11, wherein the at least one model includes at least one from among a statistical model, a machine learning model, a mathematical model, a process model, and a data model.

19. The computing device of claim 11, wherein the processor is further configured to:
   utilize the chain-style syntax to perform operations asynchronously,
   wherein the dynamically adjust comprises dynamically adjusting without user intervention and from a first processing paradigm to a second processing paradigm, and
   wherein at least one from among the first processing paradigm and the second processing paradigm utilizes at least a single processing core.

20. The computing device of claim 11, wherein the processor is further configured to:
   utilize a features catalog to automate schema tracking and validate data operations that include the operations involved in producing the processed dataset.

* * * * *